May 26, 1970  C. M. KLINE ET AL  3,513,648
ROTARY MOWER DISC GUARDS
Filed May 25, 1967  2 Sheets-Sheet 1

INVENTORS
CHARLES M. KLINE
& NEIL W. WEBSTER
BY Joseph A. Brown
ATTORNEY

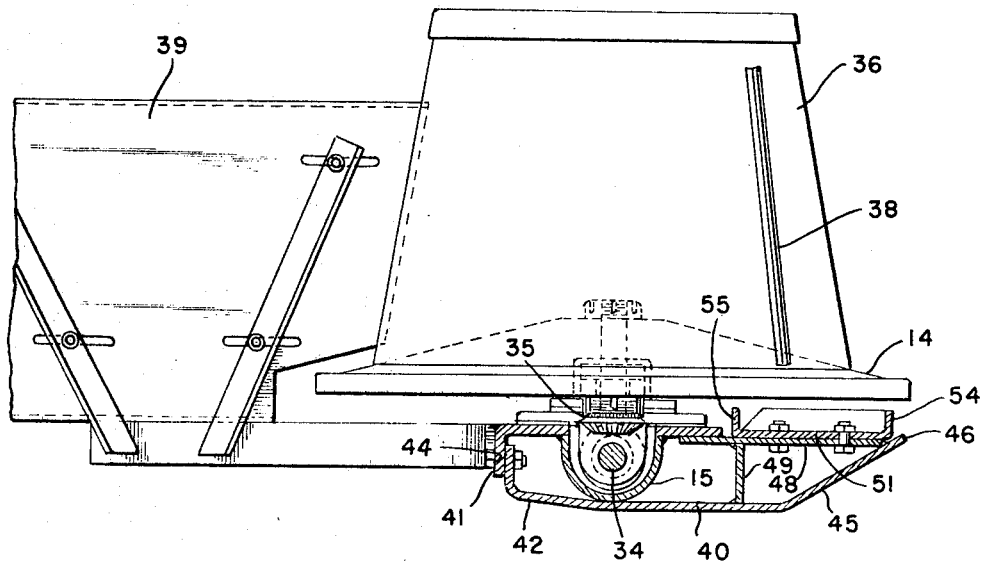
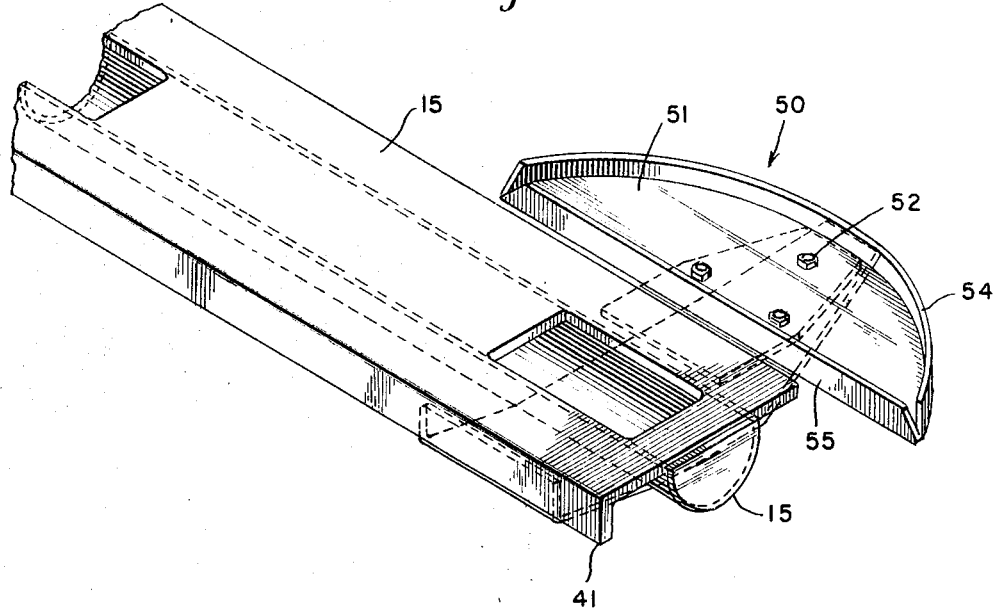

United States Patent Office 3,513,648
Patented May 26, 1970

3,513,648
ROTARY MOWER DISC GUARDS
Charles M. Kline, Reinholds, and Neil W. Webster, New Holland, Pa., assignors to Sperry Rand Corporation, New Holland, Pa., a corporation of Delaware
Filed May 25, 1967, Ser. No. 641,274
Int. Cl. A01d 35/26
U.S. Cl. 56—25.4         8 Claims

ABSTRACT OF THE DISCLOSURE

A rotary mower having a support bar located adjacent the ground and a crop cutting element mounted on top of the support bar for rotation on a vertically extending axis, said cutting element projecting forwardly of the support bar and there being a ground engageable guide shoe attached to the support bar beneath the cutting element to cause it to rise and fall responsive to ground conditions, and a rock guard carried on the shoe to protect the cutting element from damage.

BACKGROUND OF THE INVENTION

For cutting dense crop material, rotary mowers have been provided having a transverse support bar located adjacent the ground and supporting thereon a plurality of side by side crop cutting elements. The cutting elements rotate at high speeds such as three thousand r.p.m. in horizontal planes close to the ground. Each cutting element has outwardly projecting knife means and they rotate in timed relation to each other to cut a swath of material.

Although mowers of this type are effective in cutting certain crops, they are vulnerable to damage because the knife means on the cutting elements projects radially and is exposed to engagement with ground objects such as rocks, mounds of earth and the like.

SUMMARY OF THE INVENTION

A main object of this invention is to provide improved means in a rotary mower of the character described which will render the mower more responsive to variations in ground conditions than similar mowers of prior design.

Another object of this invention is to provide a rotary mower having individual cutting units each of which is provided with its own guide structure so that if any cutting unit approaches an object, the mower as a whole will respond to it and be less subject to damage.

Another object of this invention is to provide a rotary mower having means to protect the cutting elements from damage by engaging rocks, tree stumps or similar obstacles.

A further object of this invention is to provide, in a mower of the character described, rock guards which can be readily replaced if they become damaged.

Other objects of this invention will be apparent hereinafter from the specification and from the recital in the appended claims.

DESCRIPTION OF THE DRAWINGS

FIG. 4 is a view looking from right to left in FIG. 3 and with the under portion of the structure in section and the cone mounted in place; and FIG. 5 is a perspective assembly view of the outboard end of the longitudinal frame of the mower, the semicircular rock guard and the guide shoe.

PREFERRED EMBODIMENT OF THE INVENTION

Figure 1:
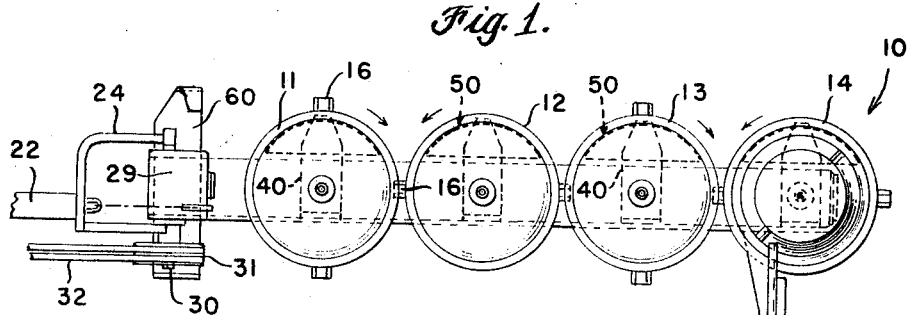
FIG. 1 is a plan view of a rotary mower having guide shoe and rock guard means constructed according to this invention.
Figure 2:
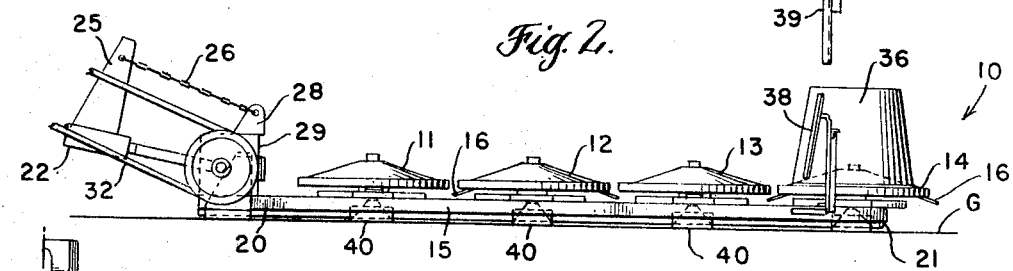
FIG. 2 is a rear elevation of FIG. 1.

Referring now to the drawings by numerals of reference, 10 denotes generally a rotary mower having crop cutting elements or units in the form of discs, 11, 12, 13 and 14 mounted in side by side relation on a support bar 15 which extends transversely relative to the direction of travel of the mower and adjacent the ground G. Each cutting element is rotatable about a vertically extending axis and all are substantially the same diameter. Each cutting element has a pair of knives 16 and they rotate in the directions indicated by the arrows in FIG. 1 in timed relation with each other so that they cut overlapping paths and the knives on one element do not engage knives on an adjacent element.

Support bar 15 has an inboard end 20 and an outboard end 21. The inboard end is connected to a tractor, not shown, by means of a support 22, a bracket 24, an upstanding frame element 25 and a chain 26 which connects to a bracket 28 on top of a gearbox 29. The gearbox has an input drive shaft 30 which carries a double sheave 31 driven by belts 32 connected to a suitable source of power. The gearbox transmits power to elements 11–14 through a drive shaft 34 within support bar 15. At each disc location, a bevel gear connection 35 is provided to drive the cutting element above it.

To facilitate the separation of the standing crop material from the material being cut, outboard element 14 has a truncated cone 36 provided with vertically extending rib means 38. Element 14 rotates in a counterclockwise direction when viewed as shown in FIG. 1. The rib means 38 sweeps the crop material inwardly relative to the mower and then discharges it rearwardly where it is engaged by vertical deflector 39 and deposited on the ground rather than being cast into the standing crop.

To guide and guard each crop cutting element, a shoe 40 is provided beneath each disc. Each shoe is located in alignment with the vertical axes of rotation of its associated cutting element and it has a width less than the radius of the disc. As shown best in FIG. 4, support bar 15 has a downwardly extending flange 41 to which a rearward portion 42 of each guide shoe is bolted at 44. Each shoe extends in a fore-and-aft direction relative to support 15 and the forward end 45 of each shoe is inclined upwardly and is tapered toward a blunt front end 46. In addition, each shoe has a horizontal section 48 which extends from front end 16 rearwardly to support 15. A vertical strengthening member is provided at 49.

Figure 3:
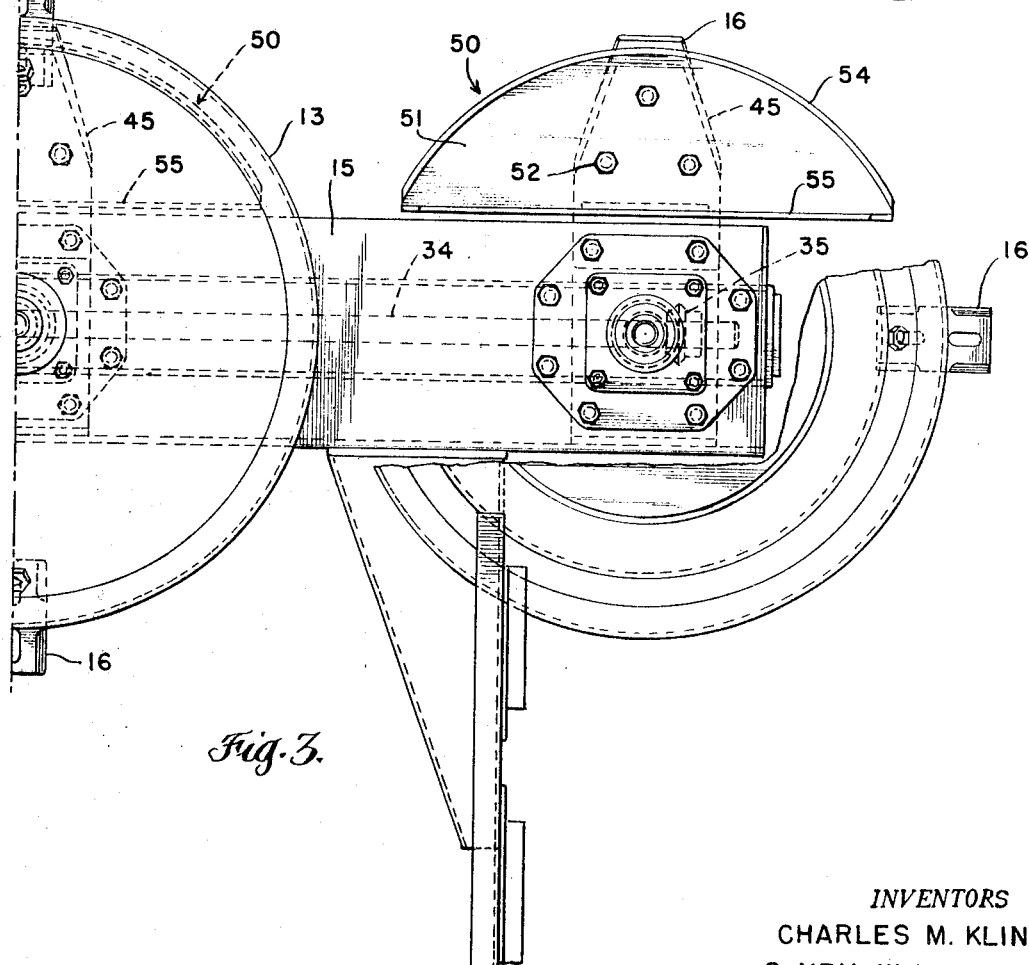
FIG. 3 is an enlarged plan view of the outboard end of the mower with the cone on the cutting element removed to show the guide shoe and rock guard of this invention.

One top of each shoe 40 there is a rock guard 50 comprising an arcuate plate 51 detachably connected to shoe section 48 by bolts 52. Plate 51 has an upturned arcuate flange 54 at the forward portion of the shoe and upturned rearward flange 55 in front of and parallel to support 15. As shown best in FIG. 3, the leading edge of the rock guard is generally concentric to the axis of rotation of its associated cutting element. The radius of the rock guard, however, is somewhat less than its associated disc as best shown in FIG. 4.

As shown in FIG. 1, and as brought out in the other figures, all of the cutting elements have a guide shoe 40 and a rock guard 50 whereby each cutting unit is provided with its own protecting structure. Therefore, when any cutting element 11–14 engages a ground obstacle, the entire mowing mechanism will respond to it.

In addition to the shoes for each cutting element, there is a large inboard shoe 60 to protect gearbox 29. Therefore, in the structure shown there are five ground shoes all of which aid in the guiding of the mower.

The arcuate rock guards 50 deflect ground objects away from their associated cutting elements and if they are damaged and bent with the passage of time, they can be easily replaced merely by removing the fasteners 52.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. In a rotary mower, a support bar which extends in a horizontal direction adjacent the ground and transverse to ground travel, a plurality of crop cutting elements mounted in side by side relation on top of said support bar for rotation about vertically extending axes, each element projecting forwardly of said support bar and having a disc with a periphery and knives extending therefrom, a plurality of rock guards and guide shoes, each rock guard mounted in front of said support bar in a horizontally extending plane beneath a respective disc and each shoe extending transversely and attached to the underside of said support bar and aligned with its associated element and having a horizontal bottom section extending forwardly from the rear of said support bar and a forwardly tapered section extending upwardly and forwardly from said bottom section to the periphery of the respective disc for supporting a respective rock guard and for responding to ground conditions at each cutting element.

2. In a rotary mower as recited in claim 1 wherein each rock guard comprises a segment of an arc and has a curved forward edge to deflect objects away from its associated cutting element.

3. In a rotary mower as recited in claim 2 wherein the forward edge of each rock guard is generally concentric to the axis of rotation of its associated cutting element, and the radius of the guard is less than the radius of the cutting element.

4. In a rotary mower as recited in claim 1 wherein each guide shoe has a top plate to which its associated rock guard is detachably connected whereby the rock guard may be replaced when damaged.

5. In a rotary mower having a support bar positionable horizontal to the ground and extending transverse to ground travel and carrying a plurality of crop cutting elements mounted in side by side relation along the support bar and having rotatably mounted discs with circular peripheries and knives extending therefrom on rotation to define a circular cutting path with the knives and discs projecting forwardly of the support bar, a plurality of guide shoes positioned underneath a respective crop cutting element, each of said guide shoes being generally rectangular in shape and extending from the rear edge of said support bar forwardly to adjacent the periphery of said respective disc with an upwardly sloped forward tapered tip narrowing in the direction of travel and having a flat supporting portion between said forward tip and said support bar, a plurality of guards each having a flat member with a curved edge corresponding to the circular peripheral cutting path of the respective knives and detachably mounted thereon and extending longitudinally on each side thereof for protecting each of said cutting elements from rocks and the like and said mower on moving along a path of travel engaging ground conditions projecting in the path of a respective crop cutting element to raise the mower and protect the knives and disc of the cutting elements from engagement.

6. In a rotary mower as set forth in claim 4 wherein said support member has a downwardly and longitudinally extending flange at the rear and each guide shoe has an upwardly extending flange attached to said downwardly extending flange.

7. In a rotary mower as set forth in claim 4 wherein said guards each have an upwardly extending flange along the curved edge.

8. In a rotary mower as set forth in claim 5 wherein said guide shoes are positioned beneath the axis of rotation of a respective crop cutting element thereabove and has a width less than the radius of said respective discs.

References Cited

UNITED STATES PATENTS

| | | | |
|---|---|---|---|
| 1,152,994 | 9/1915 | Vitek | 56—25.4 |
| 1,397,365 | 11/1925 | Cook | 56—25.4 |
| 2,153,771 | 4/1939 | Orr | 56—25.4 |
| 2,625,784 | 1/1953 | Kelsey | 56—25.4 |
| 3,034,275 | 5/1962 | Happe et al. | 56—25.4 |
| 3,350,864 | 11/1967 | Sheps et al. | 56—24.4 |

ANTONIO F. GUIDA, Primary Examiner